July 11, 1933.   L. H. VON OHLSEN ET AL   1,917,472

SYSTEM AND APPARATUS FOR REGULATION

Filed Nov. 7, 1930

Louis H. Von Ohlsen
and
Frank W. Godsey, Jr
INVENTORS

BY
Janney, Blair & Curtis
ATTORNEY

Patented July 11, 1933

1,917,472

UNITED STATES PATENT OFFICE

LOUIS H. VON OHLSEN AND FRANK W. GODSEY, JR., OF NEW HAVEN, CONNECTICUT, ASSIGNORS TO THE SAFETY CAR HEATING & LIGHTING COMPANY, A CORPORATION OF NEW JERSEY

SYSTEM AND APPARATUS FOR REGULATION

Application filed November 7, 1930. Serial No. 494,173.

This invention relates to electric regulation and more particularly to an apparatus and system for the regulation of alternating current circuits.

One of the objects of this invention is to provide an inexpensive and thoroughly practical system and apparatus for regulating the output of a source of alternating current or for regulating a function of the alternating current energy in a work or translation circuit. Another object is to provide a system and apparatus of the above-mentioned character that will be simple and efficient and dependable in action. Another object is to provide a system and apparatus of the above-mentioned character in which the manifold advantages of a compressible carbon pile variable resistance may be fully realized. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

Figure 1:
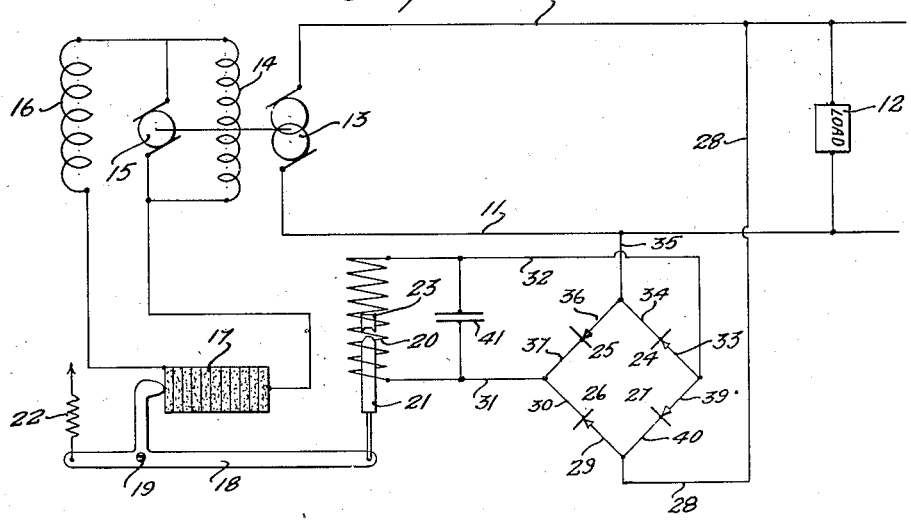
Figure 2:
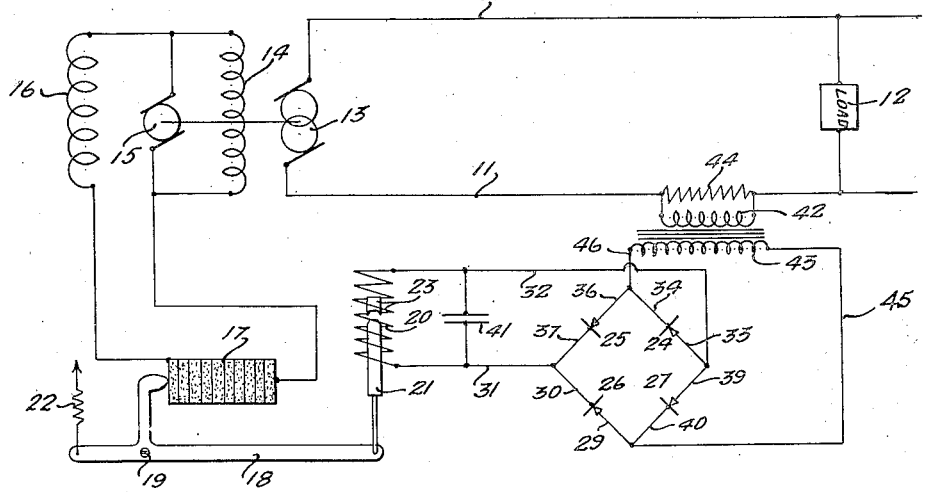

In the accompanying drawing in which are shown several of various possible embodiments of our invention:

Figure 1 shows diagrammatically a preferred form of regulating system and apparatus for regulating the voltage of an alternating current circuit, and Figure 2 is a similar diagrammatic showing of a system and apparatus for the regulation of the current in an alternating current circuit.

Similar reference characters refer to similar parts throughout the several views of the drawing.

Referring now to Figure 1 of the drawing, we have shown a main alternating current circuit 10—11 supplying alternating current to a load 12 of any suitable form, the main line 10—11 being supplied with energy from a suitable source of alternating current illustratively taking the form of an alternator 13 having an exciting field 14 energized by an exciter 15. The exciter 15 may take any suitable form and may, for example, be a shunt wound direct current generator having hence, a shunt field winding 16. The excitation supplied by the exciter 15 to the field winding of the alternator 13 may be controlled in any suitable manner, preferably, however, by controlling the excitation of the exciter generator 15; hence, there is included in the circuit of the shunt field 16 a carbon pile 17 the pressure upon which, and hence the resistance of which, may be varied, for example, by means of a bell crank lever 18, pivoted as at 19, and having a solenoid winding 20 acting, through the core 21, in a direction to relieve the pressure on the carbon pile 17, and having a spring 22, preferably adjustable, for opposing the action of the winding or coil 20.

The coil 20 and the magnetic circuit to which it is related are designed and constructed, as is diagrammatically indicated in the drawing, so that the winding 20, when energized by a cerain value of uni-directional current, holds the core 21 in whatever position it has been moved within its range of movement. For this purpose the core 21 may be tapered at its upper end and may coact with a fixed core piece 23 provided with a correspondingly tapered recess with which the upper tapered end of the core 21 coacts, in a manner now known to those skilled in the art. To achieve this action most efficiently, the current energizing the winding 20 is preferably a unidirectional current and relatively free from pulsations of low frequency. Coil 20, nevertheless, is energized by a function of the alternating current energy supplied to the load or work circuit 12, but, in accordance with certain features of my invention, in a manner to prevent the relatively low frequency, such as 60 or 25 cycles usually employed in commercial power circuits, from having a detrimental effect upon the action of the coil and core and upon the movable parts controlled or operated by the latter.

Associated in the circuit of coil 20 which, in the embodiment of Figure 1, is to be responsive to changes in effective voltage supplied to the work circuit 12, are a number of rectifiers, preferably four in number; these rectifiers are indicated in the drawing at 24, 25, 26 and 27.

These rectifiers, which may be of any suitable construction, are so connected in the circuit of coil 20 that they insure that the latter is energized by current, derived from the alternating current circuit 10—11, that flows through the coil 20 always in the same direction.

More specifically, and assuming one half wave of the potential effective across the circuit 10—11 to be momentarily effective, a current, corresponding to this half wave, may be considered as flowing from main line conductor 10, conductor 28, conductor 29, rectifier or valve 26, conductor 30, conductor 31, coil 20, conductor 32, conductor 33, valve or uni-directional device 24, conductor 34 and by way of conductor 35 to the other side of the circuit or to main line conductor 11. The next succeeding half wave of this alternating potential, being reversed or operating in opposite direction, is effective to send a current through the coil 20 in the same direction but this time from the main line conductor 11, conductor 35, conductor 36, valve 25, conductor 37, conductor 31, coil 20, conductor 32, conductor 39, valve 27, conductor 40, and by way of conductor 28 to the other side of the circuit or to main line conductor 10. This action of the valves in the circuit arrangement above described and as shown in the drawing is repeated for each cycle, the winding 20 being thus always energized by current flowing therethrough in the same direction. If desired, a condenser 41 may be bridged across the winding 20 to smooth out the successive half waves of current corresponding to these successive rectified half cycles so that the current through the winding 20 becomes a substantially steady uni-directional current proportional to the effective value of the alternating potential across the circuit 10—11.

So long as this effective value of alternating potential is of the desired or intended value, the movable parts associated with the carbon pile 17 are held in equilibrium. Should this effective value of alternating potential, however, diminish, the energization of winding 20 diminishes substantially correspondingly, carbon pile 17 becomes compressed under the action of spring 22, the excitation of exciter generator 15 is increased and likewise the excitation of alternator 13, the voltage of the latter being thus increased until the intended value is again achieved when the movable parts associated with the carbon pile 17 are again held in a state of equilibrium.

In a somewhat similar manner, should the alternating potential across the conductors 10—11 increase, the energization of winding 20 is correspondingly increased, carbon pile 17 is increased in ohmic resistance value and the excitation and hence voltage of the alternator 13 likewise diminished until the intended value of voltage is again achieved when equilibrium is restored.

In Figure 2 we have illustrated diagrammatically a system and apparatus for achieving the regulation of an alternating current or system for constancy of current flow therein and in the specific arrangement shown in Figure 2 of the regulation of the output of the above-described alternator 13 for constancy of current. Turning now to Figure 2, we have inserted in one of the line conductors, such as main line conductor 11, the low voltage winding 42 of what may be termed a current transformer, the high voltage winding 43 of which varies in the voltage of its output with variations in current flow through the winding 42. The latter may conveniently be shunted by a low resistance 44. Or, viewed in another light, the transformer 42—43 may be considered to be a step-up potential transformer, the low voltage winding 42 of which is responsive to the potential drop across the shunt or low resistance 44.

The uni-lateral valves and the winding 20, instead of being related to the main line conductors 10—11 to function in response to potential changes thereacross, as in Figure 1, are, in the arrangement of Figure 2, related to the high voltage winding 43 of the transformer 42—43.

As long as the current flowing to the load 12 is of the intended value, the movable parts associated with the carbon pile 17 are held in a state of equilibrium. Should, however, the alternating current increase, the potential of winding 43 of the transformer correspondingly increases and a current, corresponding to the half wave momentarily effective, passes through the winding 20 over a circuit which extends from one terminal of winding 43, conductor 45, conductor 29, valve 29, valve 26, conductor 30, conductor 31, winding 20, conductor 32, conductor 33, valve 24, conductor 34, and by way of conductor 46 back to the other terminal of the winding 43.

The next succeeding half wave, reversed in direction, causes a current to pass through winding 20, but, due to the action of the valves, this current passes through winding 20 in the same direction as the preceding half wave did. More specifically, this current passes from one terminal of winding 43 of the transformer, conductor 46, conductor 36, valve 25, conductor 37, conductor 31, winding 20, conductor 32, conductor 39, valve 27, conductor 40, and by way of conductor 45 back to the other terminal of winding 43. These actions are successively repeated for succeeding half cycles of the current effective in the circuit 10—11.

Increases in this current beyond the intended value cause the energization of winding 20 to be correspondingly increased with consequent reduction in the output of alternator 13 in a manner that will now be clear in view of what has been said above in connection with Figure 1, a new condition of equilibrium being achieved as soon as the intended value of current is restored. Vice versa, decreases in current in the circuit 10—11 result in a reversed action, the energization of winding 20 being diminished with resultant increase in the output of the alternator 13 and the consequent restoration of the current output thereof to normal and the achievement of a new condition of equilibrium in the movable parts associated with the carbon pile 17.

It will thus be seen that there has been provided in this invention a system and apparatus in which the several objects hereinabove noted, together with many thoroughly practical advantages are successfully achieved. It will be seen that the apparatus and system are of a thoroughly practical character and well adapted to meet the varying conditions of hard practical use. More specifically, it will be seen that, though the current voltage or energy effective in the circuit to be regulated is alternating, nevertheless, the intended or desired functioning of the electromagnetic controlling means associated with the carbon pile is successfully and dependably achieved and that the relatively low frequency variations inherent in the usual commercial alternating current power circuits, are effectively prevented from detrimentally affecting the achievement of close and accurate regulation.

In our co-pending application Serial No. 437,430, filed March 20, 1930, we have disclosed among other features but have not claimed per se, an arrangement embodying the features of interrelation and coaction between a controlling or regulating coil or winding and a related movable magnetic part and a rectifying means, all related to an alternating current circuit, whereby among other things regulation may be achieved unaffected by change in impedance or inductive reactance of the controlling winding and its magnetic circuit; to that extent the present application may be considered to be a continuation in part of the aforesaid co-pending application.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

We claim:

1. In apparatus of the character described, in combination, a source of alternating current, a carbon pile for controlling a function of the output of said source, said carbon pile having the inherent characteristic of requiring a substantially steady force for determining the pressure thereon, electromagnetic means for controlling the pressure on said carbon pile, and means including uni-lateral valves for connecting said electro-magnetic means to be responsive to the function to be regulated, said valves being arranged so that said electromagnetic means is energized by uni-directional current waves corresponding to the successive alternately reversed half waves of said function of the output of said source, whereby the force exerted by said electromagnetic means in controlling the pressure on said carbon pile is sufficiently steadied to meet the requirements of the said characteristic of said carbon pile.

2. In apparatus of the character described, in combination, a source of alternating current, a carbon pile for controlling a function of the output of said source, a winding and a movable magnetic member related and constructed to each other so that said movable member is held by said winding in whatever position said member is moved thereby upon the re-establishment of a given effective uni-directional energization of said winding, said movable member being connected to affect the pressure on said carbon pile, and means including full wave rectifying means for energizing said winding with a function of the output of said source but uni-directionally, whereby change in the relation between said movable magnetic member and said winding is prevented from detrimentally affecting the reestablishment of said effective energization.

3. In apparatus of the character described, in combination, a source of alternating current, a carbon pile for controlling a function of the output of said source, a winding and a movable magnetic member related and constructed to each other so that said movable member is held by said winding in whatever position said member is moved thereby upon the re-establishment of a given effective uni-directional energization of said winding, said movable member being connected to affect said carbon pile, and a plurality of uni-lateral valves for connecting said winding to be responsive to the voltage of the output of said source, said valves being arranged to cause passage of current through said winding always in the same direction for the successive half waves of the alternating potential, whereby change in the position of said movable member, though otherwise changing the impedance of said winding were the latter to be energized by alternating current, is prevented from changing the effective uni-directional energization thereof by said successive half waves of the alternating potential.

4. In apparatus of the character described, in combination, a source of alternating current, a carbon pile for controlling a function of the output of said source, a winding and a movable magnetic member related and constructed to each other so that said movable member is held by said winding in whatever position said member is moved thereby upon the re-establishment of a given effective uni-directional energization of said winding, said movable member being connected to affect said carbon pile, means varying in potential with variations in current output of said source, and means including a full wave rectifying means for uni-directionally energizing said coil from said means whose potential varies with the current output of said source, whereby change in the position of said movable member, though otherwise changing the impedance of said winding were the latter to be energized by alternating current, is prevented from changing the effective uni-directional energization thereof by said successive half waves of the alternating potential.

5. In apparatus of the character described, in combination, a source of alternating current, a carbon pile for controlling a function of the output of said source, a winding and a movable magnetic member related and constructed to each other so that said movable member is held by said winding in whatever position said member is moved thereby upon the re-establishment of a given effective uni-directional energization of said winding, said movable member being connected to affect said carbon pile, a transformer having a winding connected to be responsive to changes in current output of said source and having its other winding connected to energize said winding, and means interposed between said two windings for effecting rectification of the current supplied by said transformer winding to said controlling winding, whereby change in the position of said movable member, though otherwise changing the impedance of said winding were the latter to be energized by alternating current, is prevented from changing the effective uni-directional energization thereof by said successive half waves of the alternating potential.

6. In apparatus of the character described, in combination, a source of alternating current, a carbon pile for controlling a function of the output of said source, a winding and a movable magnetic member related and constructed to each other so that said movable member is held by said winding in whatever position said member is moved thereby upon the re-establishment of a given effective uni-directional energization of said winding, said movable member being connected to affect said carbon pile, a transformer having a winding connected to be responsive to changes in current output of said source and having its other winding connected to energize said winding, and full wave rectifying means interposed between said two windings, whereby change in the position of said movable member, though otherwise changing the impedance of said winding were the latter to be energized by alternating current, is prevented from changing the effective uni-directional energization thereof by said successive half waves of the alternating potential.

7. In apparatus of the character described, in combination, an alternating current circuit, regulating means including a pressure-responsive carbon pile for regulating a function of the energy in said circuit, means for controlling said carbon pile, said last-mentioned means including a coil and a magnetic circuit therefor made up of two members, one of which is movable relative to the other, a bypass condenser shunted across said coil, and means including a full wave rectifier connected to said coil to be responsive to a function of the alternating current in said circuit, whereby change in the relation between said two members, though changing the impedance of said coil to alternating current were it to be energized by the latter, may take place without changing the impedance of the coil to changes in the said function.

8. In apparatus of the character described, in combination, an alternating current circuit, a pressure-responsive carbon pile for regulating a function of the energy in said circuit, means for controlling the pressure on said carbon pile, said means including a coil and a magnetic circuit therefor, the latter having a fixed magnetic member and a movable magnetic member, the position of which changes with changes in energization of said coil, and means making said coil responsive to a function of the alternating current energy in said circuit but without permitting change in inductive reactance of said coil and magnetic circuit caused by change in position of one of the members of the latter, said last-mentioned means including connections of said coil to said circuit to be responsive to the function to be regulated and a rectifier in said connections.

9. In apparatus of the character described, in combination, a source of alternating current, a carbon pile for controlling a function of the output of said source, and means for controlling the pressure on said carbon pile, said means including a coil and a magnetic member in the magnetic field of said coil and movable thereby and mechanically connected to affect the pressure on said carbon pile, said coil and said member having the characteristic that change in position of said member in said field changes the impedance of said coil to alternating current and the current flow therethrough if energized by alternating current, and a rectifying device, and means for preventing change in the position of said member in the field of said coil from affecting the desired energization of said coil in response to changes in the function of the output of said source comprising means connecting said coil to be energized from said source through said rectifying device to be thus responsive to the function of the output of said source to be regulated for controlling the energization of said coil and to be thus freed from the possibility of change in impedance from affecting the magnitude of the energizing current of said coil.

In testimony whereof, we have signed our names to this specification this 4th day of November 1930.

FRANK W. GODSEY, JR.
LOUIS H. VON OHLSEN.